(12) United States Patent
Foti (10) Patent No.: US 8,356,325 B2
(45) Date of Patent: Jan. 15, 2013

(54) SYSTEM AND METHOD FOR TRANSFERRING A SESSION ACROSS DOMAINS AND SUBSCRIPTIONS

(75) Inventor: George Foti, Dollard-des-Ormeaux (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 469 days.

(21) Appl. No.: 12/626,828

(22) Filed: Nov. 27, 2009

(65) Prior Publication Data

US 2010/0205642 A1 Aug. 12, 2010

Related U.S. Application Data

(60) Provisional application No. 61/151,216, filed on Feb. 10, 2009.

(51) Int. Cl.
*H04N 7/173* (2011.01)
(52) U.S. Cl. ............... 725/94; 725/93; 725/95; 725/109
(58) Field of Classification Search .............. 725/93–95, 725/109
See application file for complete search history.

(56) References Cited

U.S. PATENT DOCUMENTS

2009/0094634 A1* 4/2009 Haberman et al. .............. 725/32
2010/0319025 A1* 12/2010 Lee et al. ........................ 725/40

FOREIGN PATENT DOCUMENTS

EP 1 926 319 A2 5/2008
EP 1 936 989 A1 6/2008

OTHER PUBLICATIONS

ETSI TS 123 228 V8.7.0: Digital Cellular Telecommunications System (Phase 2+); Universal Mobile Telecommunications System (UMTS); LTE; IP Multimedia Subsystem (IMS); Stage 2 (3GPP TS 23.228 version 8.7.0 Release 8); Sophia Antipolis Cedex, France, vol. 3-SA2, No. V8.7.0.; Jan. 1, 2009, XP014043021, 246 pages.
Ignacio, Mas et al.: "IPTV Session Mobility"; Communications and Networking in China, 2008; Third International Conference on, IEEE, Piscataway, NJ, USA; Aug. 25, 2008, XP031364952, 7 pages.
International Search Report for PCT/IB2010/050560 dated Aug. 10, 2010; 7 pages.

* cited by examiner

*Primary Examiner* — Hunter B Lonsberry
(74) *Attorney, Agent, or Firm* — David J Rahmer; Ericsson Canada Inc.

(57) ABSTRACT

A system and method for transferring a session between IPTV Control Servers, or between IMS subscriptions, allows the IPTV Control Servers involved in the transfer to connect to each other and facilitate a transfer of session transfer information. This session transfer information allows the recipient of the transfer to connect to the same content distribution network and resume the session using the same content servers where appropriate.

20 Claims, 8 Drawing Sheets

SYSTEM AND METHOD FOR TRANSFERRING A SESSION ACROSS DOMAINS AND SUBSCRIPTIONS

CROSS REFERENCE TO RELATED APPLICATIONS

This application claims the benefit of priority to U.S. Provisional Patent Application No. 61/151,216, filed Feb. 10, 2009, entitled "SESSION TRANSFER ACROSS MULTIPLE DOMAINS AND MULTIPLE SUBSCRIPTIONS", the contents of which are incorporated herein by reference.

TECHNICAL FIELD

This invention relates generally to the transfer of a session in an IPTV environment.

BACKGROUND

IPTV employs a packet based delivery mechanism to provide the user with streamed content. Typically, an IPTV network utilizes SIP as a signaling protocol used to create sessions between a viewer terminal and a content source. The use of SIP allows an intermediate node, such as an IPTV control server, to create a session between the viewer terminal and a content source. The IPTV control server can then centralize user authentication and authorization functions. Additionally, the billing can be handled using the records generated by the IPTV control server.

Content On Demand (COD) delivery systems in an IPTV context are known in the art. Similarly, the transferring of a session between one user terminal and another is also known in the art. It is common, and known in the art, for a user to be able to pause a COD session and request to the IPTV control server transfer the session to another terminal. This allows a user, for example, to begin watching a movie in one room of a house and then transfer the movie to another room in the house. To the IPTV control server, each set top box, or Open IPTV Terminal Function (OITF) is a separate entity and thus, a user requesting that content be delivered to a first terminal does not necessarily imply that the content should be automatically delivered to another terminal. Session transfer provides a useful function to the end user and improves the user experience.

However, session transfer mechanisms known in the art all revolve around an IPTV control server transferring a session from one OITF to another, where both OITFs are served by the same IPTV control server. Although this is not a problem in many instances, it does deny the user a certain amount of flexibility. For example, if a user begins a COD program at home, but then wishes to transfer the program to a mobile device it may not be possible if the two terminals are served by different IPTV control servers. One skilled in the art will appreciate that from a logical perspective different Internet Multimedia System (IMS) subscriptions are no different than different IPTV control servers. Although the following discussion makes reference to independent IPTV control servers, one server facilitating two different subscriptions is equivalent.

There are many technical difficulties associated with transferring a session between terminals not served by the same IPTV control server (or as indicated above between two different subscriptions on the same physical server). Whereas the transfer between terminals served by the same IPTV control server (and under the same subscription) can simply be performed by having the IPTV control server direct the content source to specify new destination for the content stream, this is not possible if the transfer destination terminal is not served by the same IPTV control server. An IPTV Control server typically creates two signaling sessions, a first session connecting the IPTV Control Server to the terminal endpoint, and a second session connecting the IPTV Control Server to a content source.

The sessions created by the IPTV control server, a first session typically connecting the IPTV control server to a terminal and a second session connecting the IPTV control server to the content source, allow the IPTV control server, acting as a third party call control, to monitor and control session information using the protocol such as SIP. The IPTV control server associated with an intended recipient terminal has none of the session information known by a first IPTV control server. As such, the 2nd IPTV control server cannot control the session in the same manner. Accordingly, session transfer using traditional and known methods is not possible across multiple IPTV control servers.

It is, therefore, desirable to provide a mechanism for a contact-centric view of social networking.

SUMMARY

It is an object of the present invention to obviate or mitigate at least one disadvantage of the prior art.

In a first aspect of the present invention, there is provided an Internet Protocol Television (IPTV) Control Server having a network address. The control server comprises a downstream interface, an upstream interface, a control server interface and a processor. The downstream interface initializes a session with an IPTV terminal, and transmits the network address to the terminal during the session initialization. The upstream interface initializes a session between the terminal and a content provider and receives state information about the terminal-to-content provider session. The control server interface communicates with a second control server. The processor requests the state information through the upstream interface in response to a request from a second control server, received over the control server interface, for a session transfer, and provides the second control server with state information in response to the request for the session transfer.

In an embodiment of the first aspect of the present invention, the downstream interface communicates with the IPTV terminal through intermediate nodes, and optionally the IPTV terminal is an Open IPTV Terminal Function. In another embodiment, the downstream interface, the upstream interface and the control server are integrated into a common network interface.

In a further embodiment, the processor is operative to generate bookmarking information associated with the session, the bookmarking information identifying the location of the IPTV Terminal in the session. Optionally, the bookmarking information is a part of the session transfer information provided to the second control server, and the system can further include a database for storing the generated bookmarking information.

In another embodiment, the processor is operative to issue a request for a session transfer through the control server interface. Optionally, the processor is operative to receive session transfer information through the control server interface in response to the request, and is further operative to initiate a session between the IPTV terminal and a content source specified by the received session transfer information in accordance with parameters identified in the session transfer information. In a further embodiment, the server further including a database for storing received session transfer information In a second aspect of the present invention, there is provided a method of transferring a session administered by an Internet Protocol Television (IPTV) Control Server, the session connecting a content source and an IPTV terminal. The method comprises the steps of receiving at the IPTV Control Server, from a second IPTV Control Server, a request to transfer administration of the session; and sending session transfer information associated with the session to the second IPTV Control Server in response to the received request.

In an embodiment of the second aspect of the present invention, the method further includes the step of requesting that the IPTV terminal pause the session, which in some embodiments follows the step of sending. In another embodiment, the method additionally includes the step of generating a bookmark for the session, the bookmark recording the present location of the IPTV terminal in a session playback process. In an alternate embodiment, the bookmark is included in the session transfer information sent to the second IPTV Control Server.

In a further embodiment of the second aspect, the session transfer information includes information identifying content delivery nodes associated with the session. In another embodiment, the method further includes the step of requesting that the session be torn down after sending the session transfer information.

In a third aspect of the present invention, there is provided a method of transferring a session administered by a first Internet Protocol Television (IPTV) Control Server to a second IPTV Control server, the session connecting a content source and an IPTV terminal. The method comprises the steps of receiving, at the second IPTV Control Server, instructions from an IPTV terminal to begin a transfer of the session from the first IPTV Control Server, the session transfer instructions including a network address associated with the first IPTV Control Server; transmitting a request to the first IPTV Control Server to transfer administrative control of the session; receiving session transfer information associated with session in response to the transmitted request; and initiating a session between the IPTV terminal from which the instructions to being the transfer were received and a content source identified in the session transfer information.

In an embodiment of the third aspect of the present invention, the IPTV terminal from which instructions to being the transfer are received is distinct from the IPTV terminal participating in the session to be transferred. In another embodiment, the instructions to request a transfer include session transfer information associated with the session to be transferred, and optionally the session transfer information includes a bookmark. In a further embodiment, the step of transmitting a request includes transmitting a request for bookmarking information, and optionally the received session transfer information includes the requested bookmarking information.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to a system and method for transferring an IPTV session from one terminal to another. The system and method allows for a transfer to occur when each of the terminals is served by a different IPTV control server, or when the two terminals each belong to different IMS subscriptions.

As noted above, session transfer between nodes in an IPTV network has typically been limited to transferring a session between two terminal nodes served by the same IPTV control server, and typically belonging to the same IMS subscription. For the purposes of simplicity in the following description, it should be understood by those skilled in the art that references to independent IPTV control servers also includes the logically similar situation of a single physical IPTV control server supporting OITF nodes under different IMS subscriptions. Many problems associated with transferring session between two nodes served by different control servers have not been addressed by the prior art. One reason for the lack of attention paid to the problems associated with transferring a session between two nodes served by different control servers is that very little attention has been paid to the entire idea of transferring session between terminals served by different control servers or terminals under different subscriptions.

As will be understood by one of skill in the art, an Open IPTV Terminal Function (OITF) creates a signaling session with the IPTV Control Server (IPTV CS). In turn, the IPTV Control Server forms a signaling session with upstream content delivery nodes such as the Content Delivery Network Controller (CDNC), the Cluster Controller (CC) and the Content Delivery Function (CDF). In the presently preferred embodiments the signaling sessions employee the Session Initialization Protocol (SIP), however, one skilled in the art will appreciate that other signaling protocols can be employed in place of SIP and additionally signaling components of other protocols can be used without departing from the scope of the present invention which is solely defined by the claims of this application. The SIP signaling sessions are used to create a control channel between the OITF and the upstream content delivery nodes. By being in the middle of the two signaling sessions, the IPTV CS is able to play the role of a "man-in-the-middle" and observe the information being relayed between these nodes. The IPTV CS can use this position to create sets of session information identifying characteristics of the user session to uniquely identify the source and destination of the content, and other assorted information that will be apparent to those skilled in the art. This session information is typically used when a session is transferred from a first OITF to a second OITF served by the control server.

When two IPTV Control Servers are required, transfers are made more difficult because the second IPTV Control Server does not have access to the session information created by the first control server. Because the two control servers have no guaranteed relationship to each other, the first IPTV CS does not necessarily have any mechanism through which to identify which IPTV CS in a data network the session information should be transferred to. When the OITF receiving the transferred session is supported by a different IPTV CS, the original IPTV CS will not necessarily have information about the receiving OITF or any of the infrastructure nodes that provide it with services, as such, the IPTV CS will not know where the session information will be transferred, and accordingly it lacks the mechanism to do such a transfer Similarly, the terminal receiving the transfer, much like the IPTV CS that service it, has no mechanism for determining which IPTV CS in the data network has the relevant session information. Because the two terminals are not served by the same IPTV CS having one terminal contact the other to initiate a transfer of a session is also difficult because the terminals may not know how to access each other. These problems, and others associated with session transfer can be addressed by making use of a method such as the method outlined below. One skilled in the art will appreciate that in its most basic form, the method of the present invention may not address all the problems of the prior art outlined above is that it attempts to obviate or mitigate at least one of the disadvantages of the prior art solutions related to session transfer.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Figure 1:
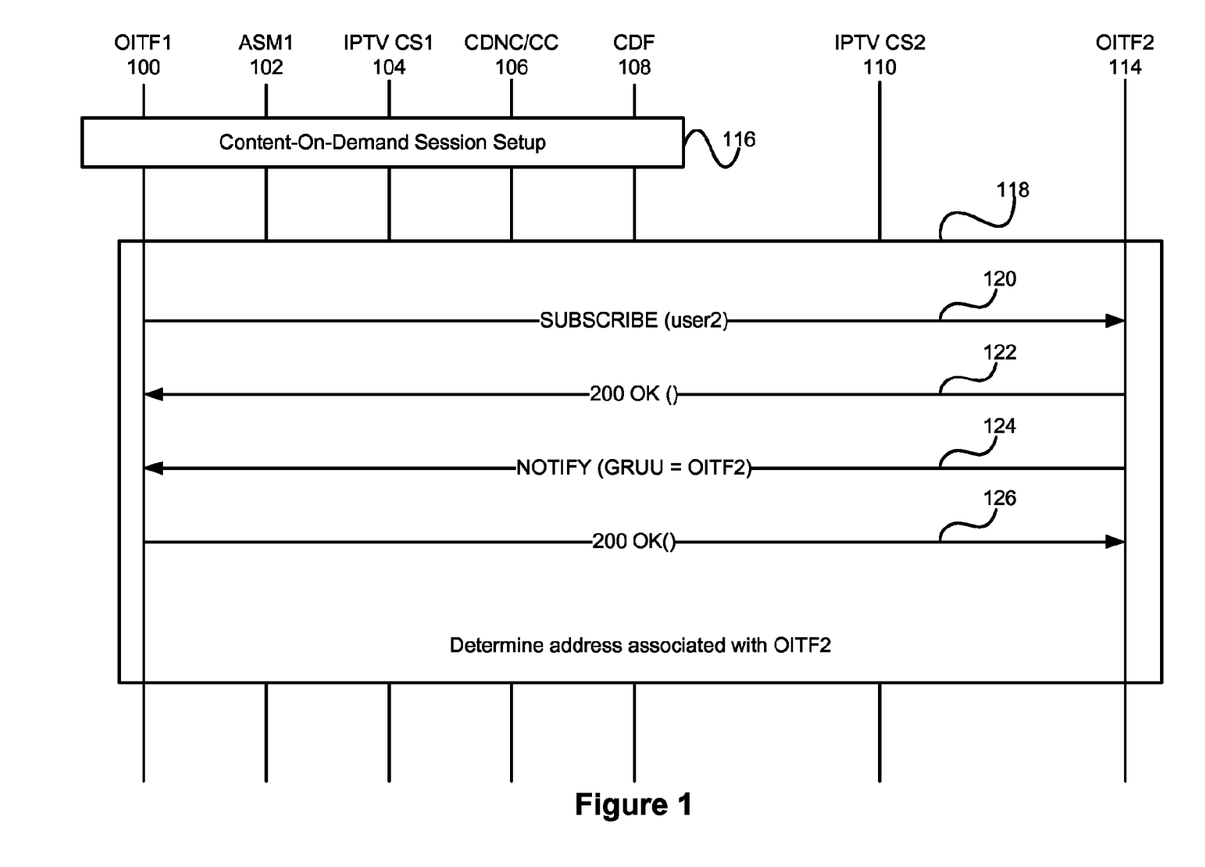
FIG. 1 illustrates a message flow diagram indicating a message flow used during an exemplary embodiment of the initialization of a process of the present invention.
Figure 2:
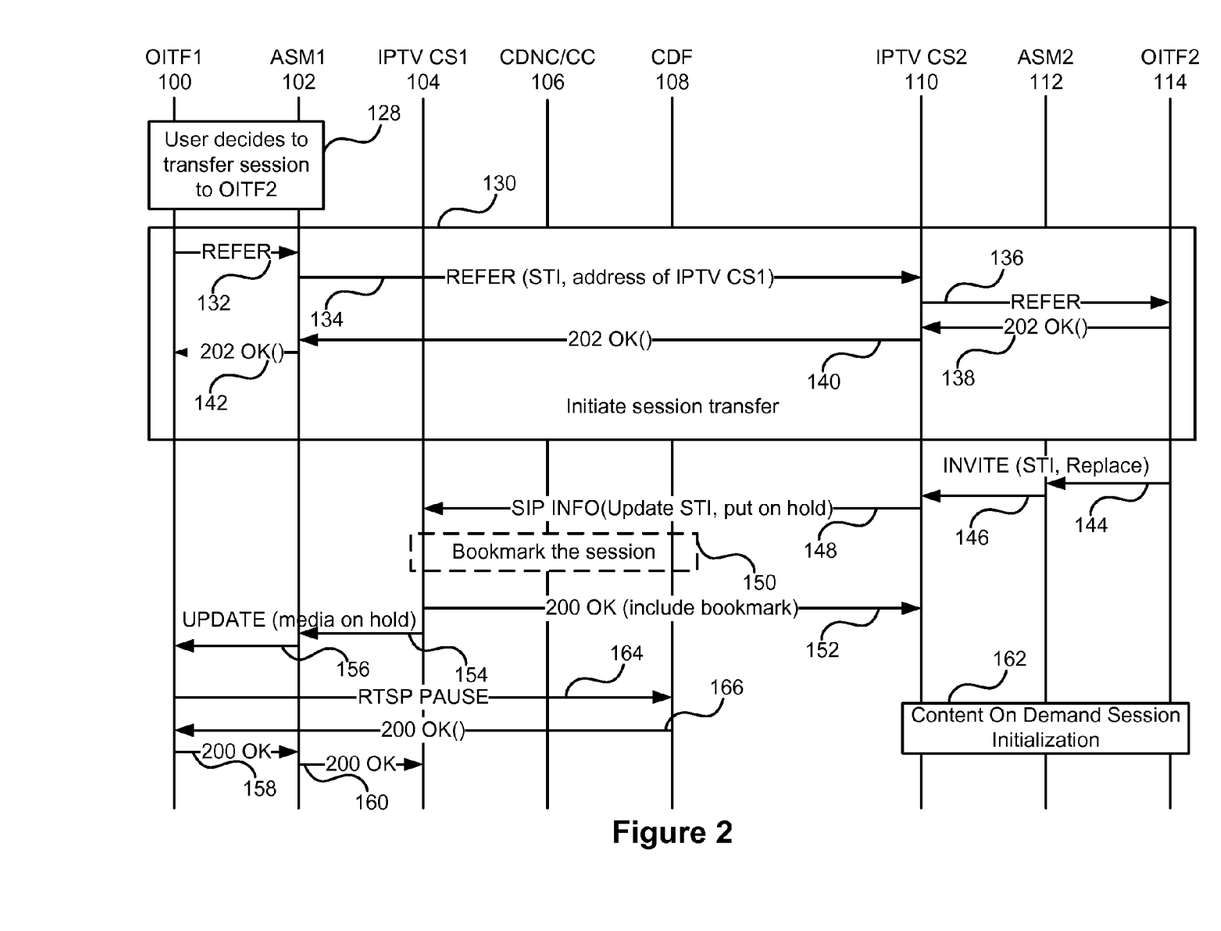
FIG. 2 illustrates a message flow diagram indicating a message flow used during an exemplary embodiment of the present invention.
Figure 3:
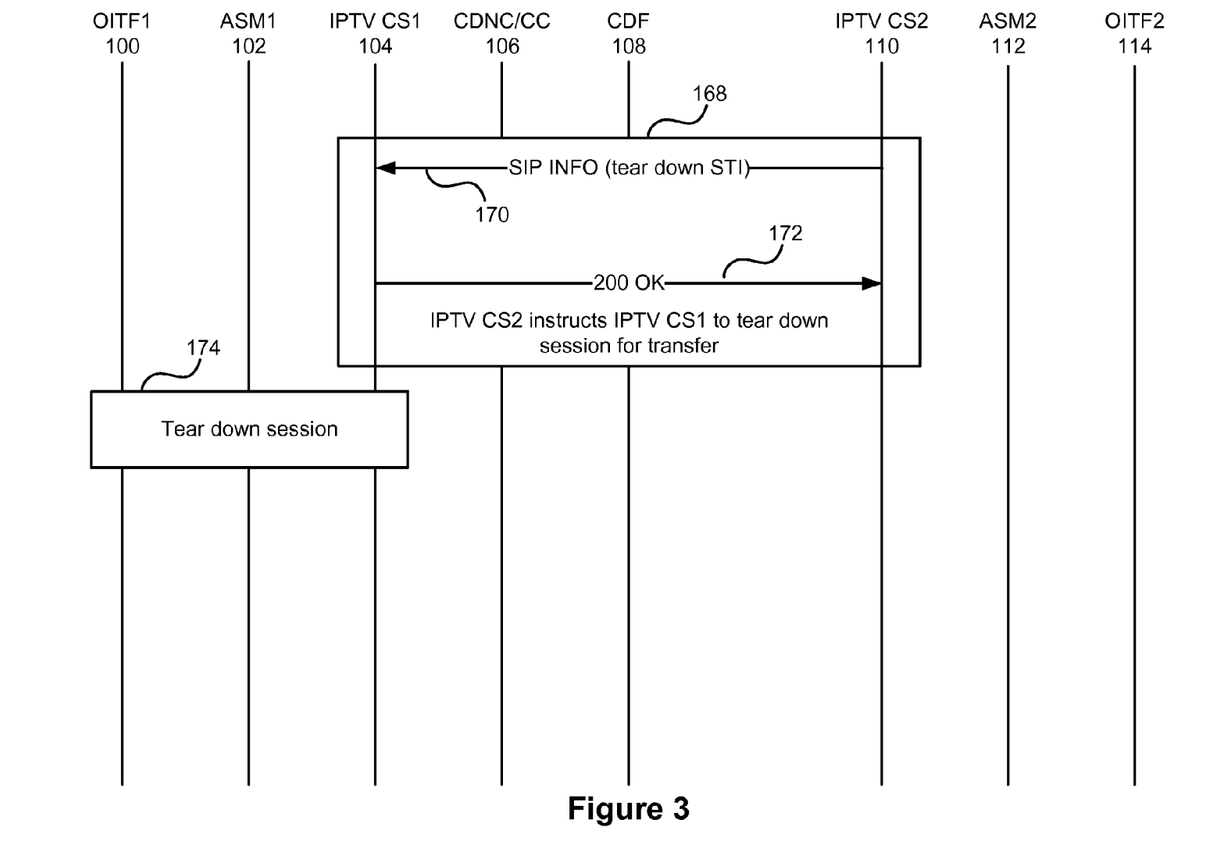
FIG. 3 illustrates a message flow diagram indicating a message flow used during exemplary embodiment of the present invention.

FIGS. 1-3, taken together, illustrate a method of transferring session between two OITF terminals served by different IPTV control servers, or as noted above under different IMS subscriptions. It should be understood that the method outlined in the message passing diagrams is simply an exemplary embodiment of the present invention, and should not be treated as an exhaustive listing of the steps of the present invention. One skilled in the art will also appreciate that a number of steps outlined in this set of message passing diagrams can be combined with other steps to achieve the same result without departing from the scope of the present invention.

FIG. 1 illustrates a flow of messages passed between nodes in an exemplary method of the present invention. The nodes employed in the present example are a first Open IPTV Terminal Function (OITF1) 100 which is connected to an Authentication and Session Management node (ASM) 102 through a data network. Through this data network, OITF1 100 is also connected to an IPTV Control Server, in this case the first IPTV control server (IPTV CS1) 104. Upstream from the IPTV CS1 104 is the Content Delivery Network Controller/Cluster Controller (CDNC/CC) 106 and the content delivery function (CDF) 108. The destination for the session transfer is the 2nd OITF (OITF2) 114, which is served by a second IPTV Control Server (IPTV CS2) 110. Missing from the nodes depicted in FIG. 1 is a second ASM serving OITF2.

In step 116 OITF1 creates an on-demand session to receive content from the CDF 108. The creation of this session will be understood by those skilled in the art to include, to some degree or another, each of the intervening nodes. The session controlled by a set of signaling sessions that will be familiar to those skilled in the art. The signaling sessions involve IPTV CS1 104 allowing this node to maintain information related to the session (hereinafter session information). During step 116, the IPTV CS1 104 will relay an externally accessible address to OITF1 100. This address transfer can take many forms including a public service identity (PSI) that is unique to the user and that is allocated to the user at session set up and maintained by the IPTV CS1 104 for the duration of the session and then destroyed there after (an application of a wildcarded PSI). Those skilled in the art will appreciate that in some conventional implementations, OITF1 100 only obtains a domain name that can be resolved to the address of IPTV CS1 104, this domain name may not be resolvable to an address by nodes that are external to a particular subset of the data network. The address of IPTV CS1 104 will be used later in the process.

In the method illustrated in FIGS. 1-3 a user at OITF1 determines that a session should be transferred to OITF2 114 and initiates the process from OITF1. In order to initiate this push process, OITF1 100 must have a mechanism for obtaining the address of OITF2. This is done in step 118. One skilled in the art will appreciate that OITF1 100 will not typically know the network address of the terminal to which the session will be transferred. After a first session is transferred, it may be possible for a terminal to store the destination terminal address along with a user defined description, but because terminals cannot be guaranteed to have a static address, this approach does not guarantee success. In systems that employ a Session Initialization Protocol (SIP) based signaling channel, OITF1 100 can issue a SUBSCRIBE message directed to a username (illustrated as user2) as shown in message 120. The user associated with OITF2 114 (user2) can acknowledge the SUBSCRIBE with a 200 OK message 122. The SUBSCRIBE message is directed to a user, not a specific terminal, so any node that the user is connected to can respond and provide OITF1 with a list of nodes associated with user2. Typically the SUBSCRIBE message can be routed though a presence server (not shown) to ensure that all nodes at which user2 has signed in will be notified. OITF2 114 can then issue a NOTIFY message 124 that contains a Globally Routable User agent Universal resource indicator (GRUU) specifying the particular node associated with user2 that the session should be transferred to (in this case OITF2 114). This NOTIFY message 124 is acknowledged with a 200 OK message 126. The process continues to FIG. 2

As illustrated in FIG. 2, the same network nodes are used with the addition of ASM2 112, an ASM serving a distinct network segment from the one served by ASM1. One skilled in the art will appreciate that it is possible for a single ASM to be employed, and it is likely that in cases where the two OITFs are served by one physical IPTV CS but have different subscriptions, they will be served by a single ASM. In step 128, the user determines that the session should be transferred to OITF2, whose address was obtained in step 118. The transfer decision is made in accordance with rules established and enforced by both OITF1 100 and ASM1 102.

In step 130, the session transfer is initiated, and OITF1 100 relays the address of IPTV CS1 104 to OITF2 114 (in one exemplary embodiment the address of IPTV CS1 104 is relayed in the body of the REFER). In an exemplary embodiment, a REFER message 132 is sent from OITF1 100 to ASM1 102. The REFER message is relayed 134 to OITF2 114 through IPTV CS2, which forwards the REFER message as message 136 to OITF2 114 via ASM2 112. The REFER message preferably includes session transfer information (STI) for the session to be transferred, the bookmarking information (transferred in the body of REFER if OITF1 100 bookmarked the session, although this is not strictly required) as well as an externally accessible address for IPTV CS1, and other information that may be pertinent to the transfer. This externally accessible address can be a numeric network address (such as an IP address) or an externally resolvable domain name. By relaying the REFER message 134 through IPTV CS2 110, IPTV CS2 100 is able to anticipate that OITF2 114 will be issuing a session initiation request for the incoming session transfer request. In response to the chain of REFER messages, a series of 202 OK() messages are sent in response, first 138 from OITF2 114, indicating its acceptance to perform the session transfer, to IPTV CS2 110, second 140 from IPTV CS2 110 to ASM1 102, and finally 142 from ASM1 102 to OITF1 100. The 202 OK responses follow the same signaling path as the REFER messages.

At this point in the process OITF2 114 has accepted the transfer and it sends an INVITE message 144 to ASM2 112. As illustrated in FIG. 2, the INVITE message 144 contains session transfer information received through message 136 and instructions to replace OITF1 100 with OITF2 114 as the downstream terminus of the content on demand session. ASM2 112 can perform all the necessary authentication of OITF2 114 and upon successful authentication can forward the INVITE message to IPTV CS2 110 as message 146. As both IPTV CS1 104 and IPTV CS2 110 remain in the signaling path of exchanges involving the terminal nodes, they remain stateful to all exchanges, even though this is not shown explicitly in FIG. 2. As such, IPTV CS1 104 can reject the REFER message if it concluded that the user is not authorized to transfer the session. Such a rejection will terminate the transfer. Similarly, if it is determined for any number of reasons that the transfer should not have been commenced, IPTV CS1 104 can determine to not transfer session information to IPTV CS2 110 which would also prevent the transfer.

In prior art implementations of session transfer, problems arose because there was no mechanism through which IPTV CS2 110 was able to contact IPTV CS1 104. Without contacting IPTV CS1 104, IPTV CS2 110 must rely upon the session transfer information obtained from OITF2 114, and has no ability to effect a transfer but could possibly replicate the session. In the cascade of REFER messages 132 134 and 136 both the session identification information held by OITF1 100 and the address of IPTV CS1 104 provided during the content-on-demand session setup of step 116 are provided to OITF2 114. When the INVITE message is sent to IPTV CS2 110 through 144 and 146, it contains session transfer information including the address of IPTV1 CS1 104. This allows IPTV CS2 110 to contact IPTV CS1 104 directly, allowing for a simplified process.

Upon extracting the address for IPTV CS1 104 from REFER message 134, and upon reception of the INVITE message 146, IPTV CS2 110 sends a SIP INFO message 148 to IPTV CS1 104. The message 148 requests a bookmark, if one is not received by OITF2 114, and if the operation is a session transfer and not a session replication, requests that the Content-On-Demand session be put on hold.

In step 150, IPTV CS1 104 optionally interacts with CDNC/CC 106 and CDF 108 (the upstream content nodes) to generate a session bookmark. This bookmark information along with other session information is sent back to IPTV CS2 110 in the SIP 200 OK message 152. Message 152 is sent in response to SIP INFO message 148, whether nor not bookmarking information is to be transmitted The bookmark information allows IPTV CS2 110 to resume the COD session at OITF2 114 from the point in time where the session transfer is started from OITF1 100.

Using messages 154 and 156, IPTV CS1 104 instructs OITF1 100 to issue a PAUSE command. In presently preferred embodiments, OITF1 100 has a media control session with the upstream data nodes. IPTV CS1 is not party to those sessions and thus relies upon the signaling control session to provide instructions to OITF1 100 to introduce the PAUSE into the media channel. Message 154 is preferably a SIP UPDATE( ) message instructing OITF1 100 to put the media session on hold. This message terminates at ASM 102 which then relays the UPDATE to OITF1 100 as message 156. OITF1 100 then pauses the COD session, for example using an RTSP PAUSE message 164. Upon receipt of the instruction to pause the session, CDF 108 acknowledges the request with 200 OK 166.

Following the OITF1 100 pausing the streaming session in steps 164 and 166, and to acknowledge receipt and action on the instructions, OITF1 100 transmits an acknowledgement message to IPTV CS1 104, using a SIP 200 OK message 158 to ASM1 102 which is relayed as 200 OK 160 from ASM1 102 to IPTV CS1 104.

As the COD session is being paused by OITF1 100, IPTV CS2 110 begins a COD session initialization process 162. As the transferred session is successfully initialized, IPTV CS2 110 instructs IPTV CS1 104 to tear down the original session in step 168. In the exemplary embodiment of FIG. 3, this can be done through the use of a SIP INFO message 170 which specifies the session to be torn down using the session transfer information previously sent. IPTV CS1 104 responds with a SIP 200 OK message 172 to confirm receipt of the tear down instructions. In step 174, OITF1 100 and IPTV CS1 104 tear down their session. Note that prior to tearing down the session with OITF1 100, and upon successful initialization of the transferred session by IPTV CS2 110 in step 162, in a presently preferred embodiment, OITF2 sends a SIP NOTIFY to OITF1 to report the successful completion of the session transfer in step 162. This is not shown in the figure for brevity. This message allows OITF1 to display a progress message so that the user is aware of the progress of the transfer.

Figure 4:
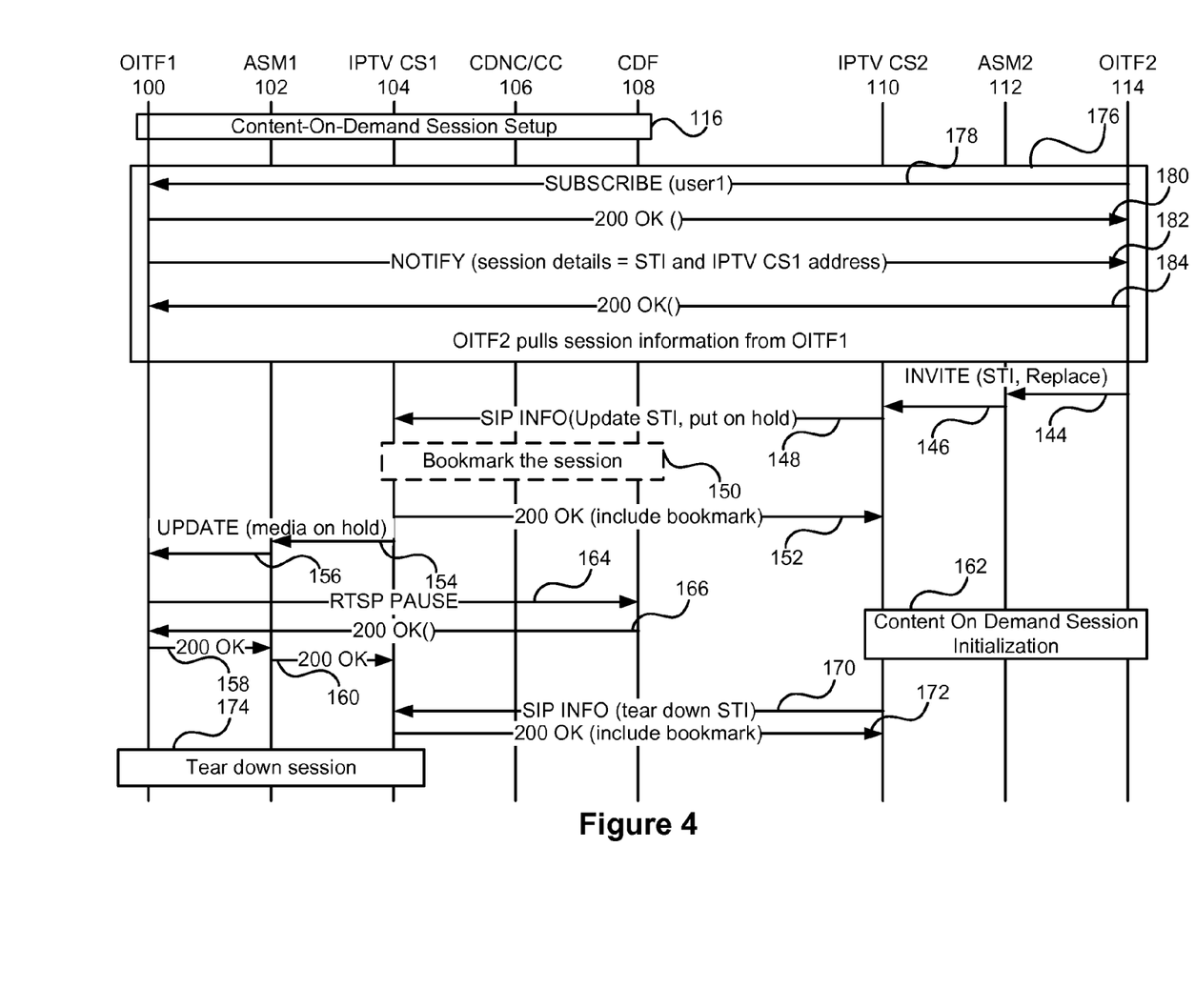
FIG. 4 illustrates a message flow diagram illustrating a second exemplary embodiment of the present invention.

FIGS. 1-3 illustrate exemplary data flows for a session transfer initiated by OITF1 100. This is an example of a PUSH transfer as the session is pushed from OITF1 100 to OITF2 114. FIG. 4 illustrates an alternate embodiment where OITF2 PULLS the session from OITF1 100 and acts as the session transfer initiator.

As with the previous example, OITF1 100 initialized a COD session in step 116. During the session setup 116 (or at other points that will be apparent to those skilled in the art) OITF1 100 obtains an externally resolvable address for IPTV CS1 104, which is the IPTV CS associated with the COD session initialized in step 116. In step 176, OITF2 114 pulls session information from OITF1 100. One skilled in the art will appreciate that after pulling the session information in step 176, the process can follow the same steps outlined in FIGS. 1-3 starting with message 144 being transmitted from OITF2 114 to ASM2 112. Similar to the PUSH Mode, IPTV CS1 104 and IPTV CS2 110 are in the signaling path of all signaling exchanges during the session transfer. Hence, if OITF1 100 is not authorized to transfer session, the SUBSCRIBE in step 178 will not reach OITF1 100. It would rather be rejected by IPTV CS1 104 which is in the signaling path.

In the illustrated example of FIG. 4, step 176 can be performed by OITF2 issuing a SIP SUBSCRIBE message 178 to OITF1 100. This SUBSCRIBE message 178 retrieves information identifying the session used by user1 for the CoD session in step 116. OITF1 100 replies to SUBSCRIBE 178 with a 200 OK 180. Subsequently, OITF1 100 then issues a NOTIFY message 182 containing session information and the externally resolvable address of IPTV CS1 104. OITF2 114 replies to the NOTIFY message 182 with a 200 OK message 184 to confirm receipt of this information.

As discussed above, and illustrated in FIGS. 1-4, transferring an established IPTV-based session from a first OITF to a second OITF, when each OITF connects to a different IPTV CS involves each of the nodes involved in the transfer playing a defined role and carrying out specific steps. The discussion below of the flowcharts of FIGS. 5-8 illustrate the steps that are common to both PUSH and PULL models.

Figure 5:
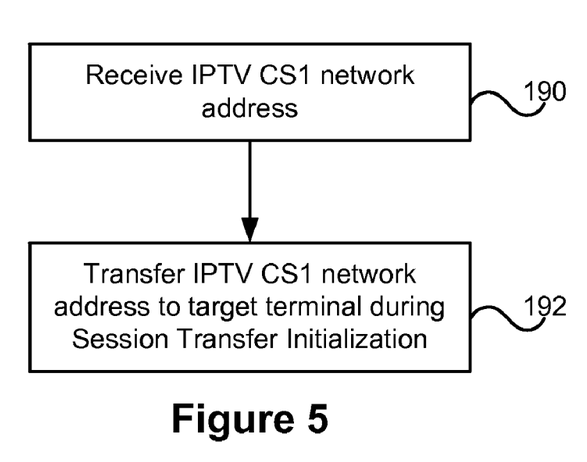
FIG. 5 is a flowchart illustrating an exemplary method of the present invention.

OITF1 is the originating terminal, that is, the terminal receiving the content that is to be transferred. OITF2 is the target terminal, that is, the terminal that the session is transferred to. FIG. 5 illustrates a method executed at OITF1 during a transfer. In step 190, OITF1 receives the address of the serving IPTV CS. In the current example the serving IPTV CS is IPTV CS1. This address information is typically provided to OITF1 during the CoD session setup process. The address of the IPTV CS1 is externally accessible, resolvable, and unique to that user Typically the address of an IPTV CS has not been accessible to nodes outside the IMS network that the IPTV CS serves. This prevents the IPTV CS from being accessed by external nodes which can provide a certain degree of security, but also limits functionality that can be achieved by having the ability to connect to nodes outside the immediate IMS network. In step 192, OITF1 transmits the received network address of IPTV CS1 (in step 190) to the target node. Step 192 is typically performed during the session transfer initialization phase. One skilled in the art will appreciate that during a PUSH transfer, step 192 may be preceded by OITF1 performing a discovery operation allowing it to find and connect to OITF2. The transmission of the address in step 192 would then be incorporated in instructions to begin a session transfer. In the case of a PULL transfer, step 192 would be achieved while pulling by the target OITF of the details of the session to be transferred as outlined above in FIG. 4.

Figure 6:
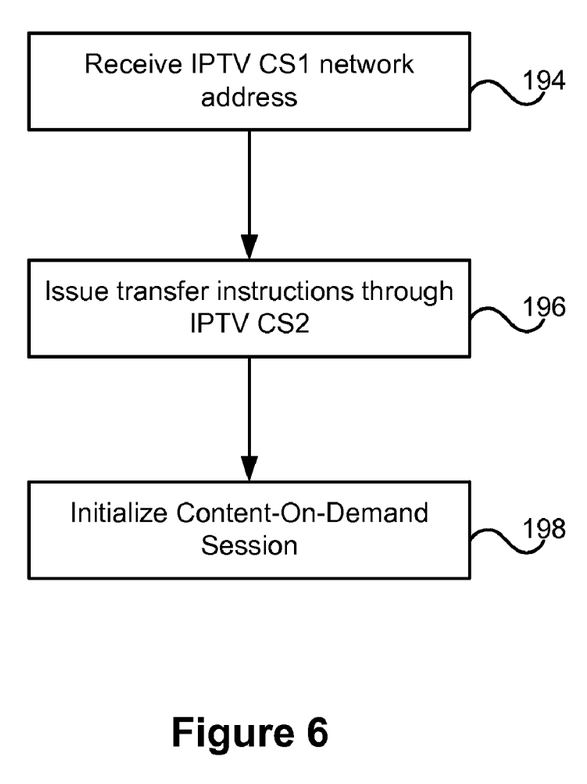
FIG. 6 is a flowchart illustrating an exemplary method of the present invention.

FIG. 6 illustrates a method executed at OITF2, the target terminal. In step 194, OITF2 receives the network address transmitted by OITF1 in step 192. In step 196 instructions to commence a session transfer are issued through IPTV CS2. These instructions typically include the received IPTV CS1 address allowing IPTV CS2 to directly connect to IPTV CS1 to negotiate the transfer. In step 198, after the transfer has been negotiated between IPTV CS1 and IPTV CS2, OITF2 initiates a Content-On-Demand session in accordance with session transfer information. As with the discussion of FIG. 5, the steps outlined in FIG. 6 are common to the PUSH and PULL embodiments. In a PUSH scenario, the IPTV CS1 address is received in step 194 in conjunction with session transfer information used it initiate the transfer. In a PULL scenario, step 194 is explicitly executed during the discovery process that allows OITF2 to identify the session transfer information.

Figure 7:
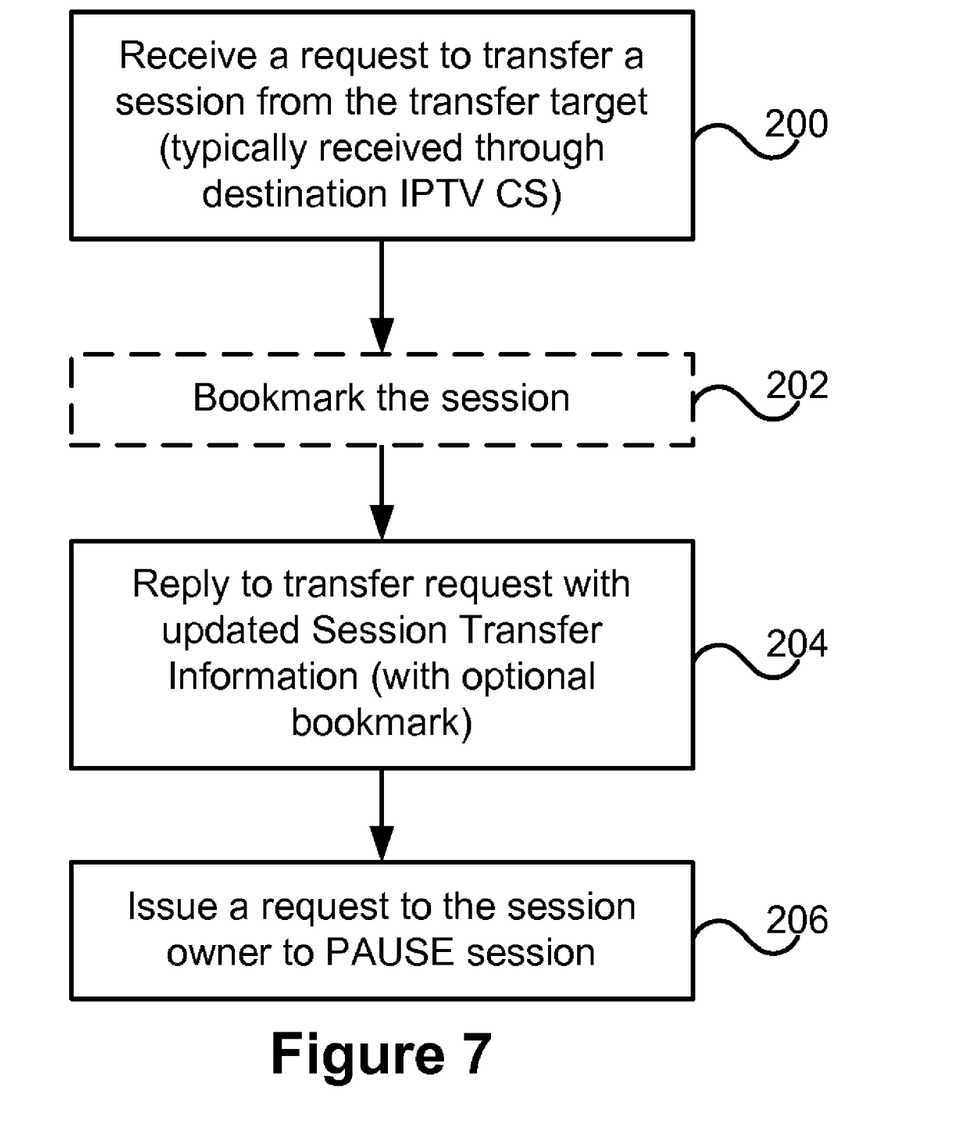
FIG. 7 is a flowchart illustrating an exemplary method of the present invention.

FIG. 7 illustrates a method that can be carried out at the source IPTV CS to effect the transfer of the session. In step 200, the IPTV CS receives a request related to a session to be transferred. The request originates with the target node, though it is routed through the destination IPTV CS. In step 202 the source IPTV CS optionally bookmarks the session, and includes the bookmark in the session transfer information associated with the session. In reply to the request received in step 200, the IPTV CS transmits the missing session transfer information (such as the bookmark) in step 204. This information is typically sent to the target terminal though if the transfer request includes the address of the destination IPTV CS, the session transfer information can be transmitted directly to the destination IPTV CS. In step 206, the IPTV CS issues instructions to the session owner requesting that the transferred session is paused.

Figure 8:
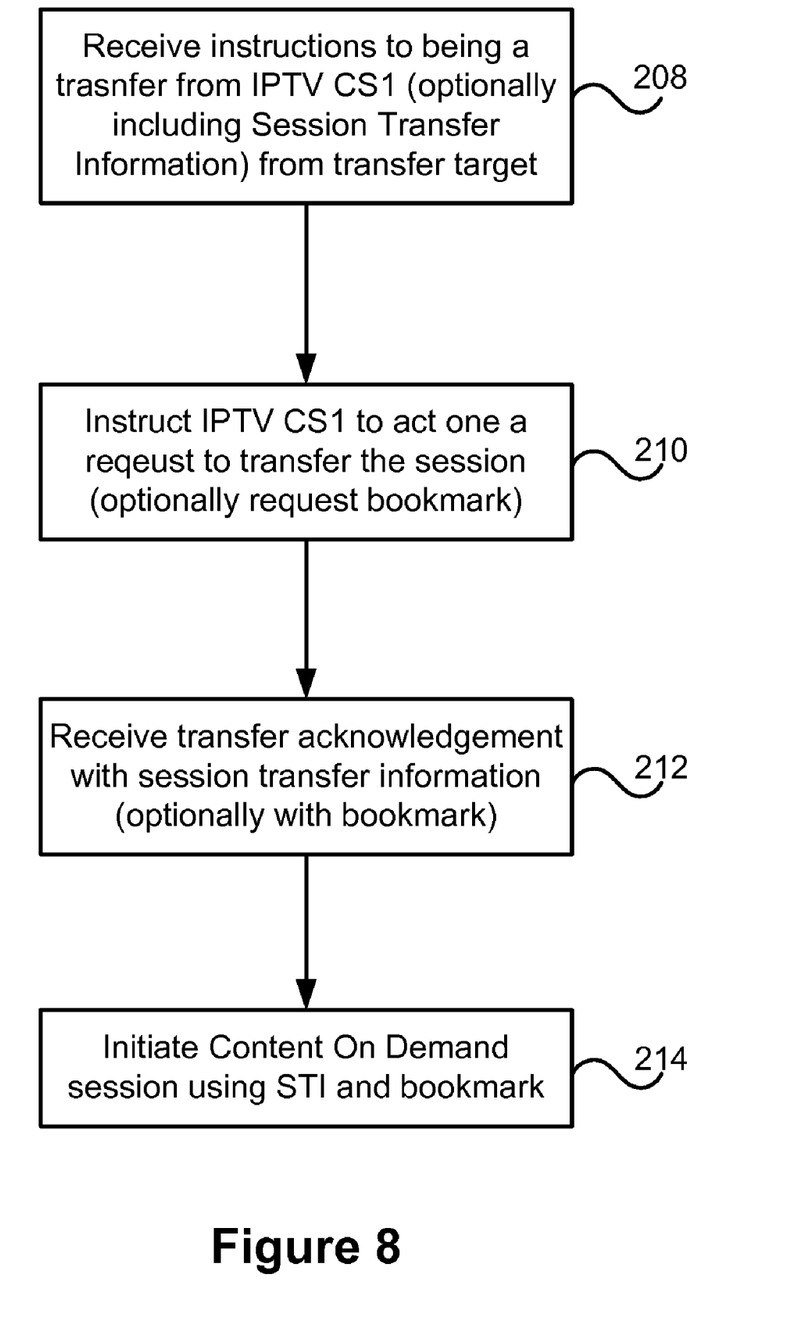
FIG. 8 is a flowchart illustrating an exemplary method of the present invention.

FIG. 8 illustrates an exemplary embodiment of a method of the present invention that can be carried out at the destination IPTV CS (IPTV CS2). In step 208, IPTV CS2 receives instructions to begin a session transfer from the target. In step 210, IPTV CS2 instructs IPTV CS1 to act on a session to be transferred, and optionally includes with this instruction a request to bookmark the session. In step 212 an acknowledgement from the source IPTV CS is received. This acknowledgement can include the bookmark. In step 214 the session transfer information is used to initiate a content on demand session between the upstream content nodes and the target terminal.

Figure 9:
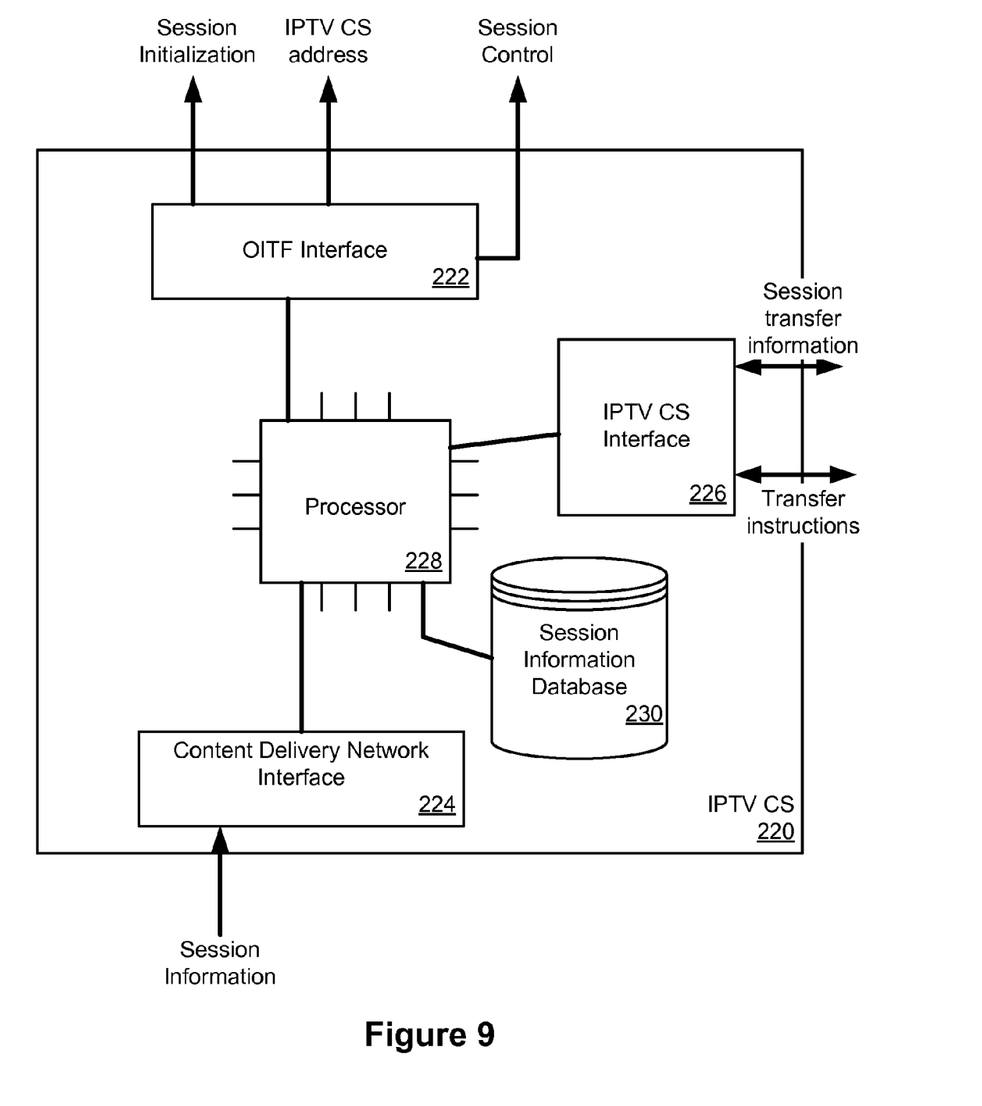
FIG. 9 is a block diagram illustrating and exemplary logical implementation of a system of the present invention.

FIG. 9 presents a block diagram that illustrates an exemplary embodiment of and IPTV CS of the present invention using logical elements. IPTV CS 220 includes a downstream interface 222 that is used to connect to the IMS network, through which connections to the served OITF are made. Although this can be described as an OITF interface, it should be understood that the connection to the OITF need not be direct, and instead an indirect connection through the IMS network is commonly employed. Through the Interface 222, session initialization information, the IPTV CS address information and session control information are exchanged with the OITF. An upstream interface 224 to the content delivery network allows the IPTV CS to connect to nodes such as the CDND/CC and CDF. Through this interface, IPTV CS 220 is able to obtain information from the upstream nodes about the session (including information identifying the session, the upstream nodes involved in the content delivery and other information that one skilled in the art will appreciate as being relevant in transferring the session). In FIG. 9 this is illustrated as session information, and in conjunction with information obtained from the OITF, through OITF interface 222, this session information is used to create the session transfer information transmitted when a session is being transferred to another IPTV CS. An IPTV CS interface 226 allows connections to other IPTV CS nodes. IPTV CS interface 226 is the logical connection point through which session transfer information is exchanged with another IPTV CS and through which transfer instructions are also exchanged. As noted above, the session transfer information is a combination of the session information received from the upstream nodes through interface 224, information received from the OITF through interface 222 and may also include other information accessible to processor 228. These dataflows from IPTV CS interface 226 are bi-directional to allow the IPTV CS 220 to be both the source and destination of a session transfer. Processor 228 controls the operation of the interfaces 222, 224 and 226. As noted above, processor 228 builds session transfer information (STI) for a session in accordance with session information exchanged with the OITF Interface 222 and the Content Delivery Network Interface 224, and stores the STI in Session Information Database 230. When a request to transfer out a session is received over IPTV CS Interface 226, processor 230 updates the relevant STI stored in database 230, transmits the STI through IPTV CS Interface 226 and instructs the originating OITF to pause, and eventually tear down the session over downstream interface 222. When processor 228 receives instructions to transfer a session in, it is typically received from an OITF through downstream interface 222, and a session transfer request is issued through IPTV CS Interface 226. The processor 228 also aids in the establishment of a session between the OITF and the upstream content nodes by using both downstream interface 222 and upstream interface 224.

One skilled in the art will appreciate that in implementations, all the interfaces 222, 224 and 226 can be provided through a single network interface. They are illustrated as distinct elements in the above example for the sake of clarity in explanation.

By providing an externally accessible address to an OITF during initialization, the IPTV CS allows other IPTV CSs to connect directly, and thus session transfer information can be exchanged. In contrast to prior art solutions, direct communication between two IPTV CS that exist on different IMS networks and serve different OITFs allows a bridge to be formed that allows the session information to be properly replicated without requiring the two OITFs to serve as waypoints in all communications. This simplifies the transfer process and increases the reliability and speed of the transfer. Although this may require that the IPTV CS is accessible to a broader array of devices on a network, there need not be a direct impact on the security and stability of the server if properly maintained and secured as will be understood by those skilled in the art.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An Internet Protocol Television (IPTV) Control Server having a network address, the control server comprising:
   a downstream interface for initializing a control session with an IPTV terminal, and for transmitting the network address to the IPTV terminal during the control session initialization;
   an upstream interface for initializing a content session between the IPTV terminal and a content provider and for receiving state information associated with the content session;
   a control server interface for communicating with a second control server; and
   a processor for requesting the state information through the upstream interface in response to a request from a second control server, received over the control server interface, to transfer administration of the control session, for providing the second control server with state information in response to the request to transfer administration of the control session, and for requesting that the IPTV terminal pause the content session.

2. The control server of claim 1 wherein the downstream interface communicates with the IPTV terminal through intermediate nodes.

3. The control server of claim 1 wherein the IPTV terminal is an Open IPTV Terminal Function.

4. The control server of claim 1 wherein the downstream interface, the upstream interface and the control server are integrated into a common network interface.

5. The control server of claim 1 wherein the processor is operative to generate bookmarking information associated with the content session, the bookmarking information identifying the location of the IPTV terminal in the content session.

6. The control server of claim 5 wherein the bookmarking information is a part of the state information provided to the second control server.

7. The control server of claim 5 further including a database for storing the generated bookmarking information.

8. The control server of claim 1 wherein the processor is operative to issue a request for a session transfer through the control server interface.

9. The control server of claim 8 wherein processor is operative to receive session transfer information through the control server interface in response to the request, and is further operative to initiate a session between the IPTV terminal and a content source specified by the received session transfer information in accordance with parameters identified in the session transfer information.

10. The control server of claim 9 further including a database for storing received session transfer information.

11. A method of transferring a session administered by an Internet Protocol Television (IPTV) Control Server, the session connecting a content source and an IPTV terminal, the method comprising:
    receiving at the IPTV Control Server, from a second IPTV Control Server, a request to transfer administration of the session;
    sending session transfer information associated with the session to the second IPTV Control Server in response to the received request; and
    requesting that the IPTV terminal pause the session.

12. The method of claim 11 further including the step of generating a bookmark for the session, the bookmark recording the present location of the IPTV terminal in a session playback process.

13. The method of claim 12 wherein the bookmark is included in the session transfer information sent to the second IPTV Control Server.

14. The method of claim 11 wherein the session transfer information includes information identifying content delivery nodes associated with the session.

15. The method of claim 11 further including the step of requesting that the session be torn down after sending the session transfer information.

16. A method of transferring a session administered by a first Internet Protocol Television (IPTV) Control Server to a second IPTV Control server, the session connecting a content source and an IPTV terminal, the method comprising:

receiving, at the second IPTV Control Server, instructions from an IPTV terminal to begin a transfer of the session from the first IPTV Control Server, the session transfer instructions including a network address associated with the first IPTV Control Server;

transmitting a request to the first IPTV Control Server to transfer administrative control of the session, the request including a request for bookmarking information;

receiving session transfer information, including the requested bookmarking information, associated with session in response to the transmitted request; and initiating a session between the IPTV terminal from which the instructions to being the transfer were received and a content source identified in the session transfer information.

17. The method of claim 16 wherein the IPTV terminal from which instructions to being the transfer are received is distinct from the IPTV terminal participating in the session to be transferred.

18. The method of claim 16 wherein the instructions to request a transfer include session transfer information associated with the session to be transferred.

19. The method of claim 18 wherein the session transfer information includes a bookmark.

20. An Internet Protocol Television (IPTV) Control Server having a network address, the control server comprising:

a downstream interface for initializing a control session with an IPTV terminal, and for transmitting the network address to the terminal during the control session initialization;

an upstream interface for initializing a content session between the IPTV terminal and a content provider and for receiving state information, including bookmarking information, associated with the content session;

a control server interface for communicating with a second control server; and a processor for requesting the state information, including the bookmarking information, through the upstream interface in response to a request from a second control server, received over the control server interface, to transfer administration of the control session, and for providing the second control server with the state information, including the bookmarking information, in response to the request to transfer administration of the control session.

* * * * *

UNITED STATES PATENT AND TRADEMARK OFFICE
CERTIFICATE OF CORRECTION

PATENT NO. : 8,356,325 B2
APPLICATION NO. : 12/626828
DATED : January 15, 2013
INVENTOR(S) : Foti Page 1 of 1

It is certified that error appears in the above-identified patent and that said Letters Patent is hereby corrected as shown below:

In Fig. 8, Sheet 7 of 8, for Tag "210", in Line 2, delete "reqeust" and insert -- request --, therefor.

In Column 3, Line 3, delete "information" and insert -- information. --, therefor.

In Column 7, Line 54, delete "IPTV1 CS1" and insert -- IPTV CS1 --, therefor.

In Column 9, Line 4, delete "CoD" and insert -- COD --, therefor.

In Column 9, Line 25, delete "CoD" and insert -- COD --, therefor.

Signed and Sealed this
Ninth Day of April, 2013

Teresa Stanek Rea
*Acting Director of the United States Patent and Trademark Office*